United States Patent
Matsushita

(10) Patent No.: US 10,500,903 B2
(45) Date of Patent: Dec. 10, 2019

(54) PNEUMATIC TIRE

(71) Applicant: The Yokohama Rubber Co., LTD., Minato-ku, Tokyo (JP)

(72) Inventor: Kohtaro Matsushita, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 708 days.

(21) Appl. No.: 14/384,526

(22) PCT Filed: Feb. 22, 2013

(86) PCT No.: PCT/JP2013/054586
§ 371 (c)(1),
(2) Date: Sep. 11, 2014

(87) PCT Pub. No.: WO2013/136947
PCT Pub. Date: Sep. 19, 2013

(65) Prior Publication Data
US 2015/0041034 A1 Feb. 12, 2015

(30) Foreign Application Priority Data

Mar. 14, 2012 (JP) ................................. 2012-057729

(51) Int. Cl.
*B60C 11/12* (2006.01)
*B60C 11/04* (2006.01)
(Continued)

(52) U.S. Cl.
CPC ...... *B60C 11/1218* (2013.01); *B60C 11/0304* (2013.01); *B60C 11/04* (2013.01);
(Continued)

(58) Field of Classification Search
CPC ............. B60C 11/0304; B60C 11/1218; B60C 2011/129; B60C 2011/1295
See application file for complete search history.

(56) References Cited

U.S. PATENT DOCUMENTS 5,660,651 A 8/1997 Diensthuber
5,783,002 A * 7/1998 Lagnier .................. B60C 11/12
152/209.1

(Continued)

FOREIGN PATENT DOCUMENTS

| CA | 2080328 | 4/1993 |
|---|---|---|
| JP | H02-133205 | 5/1990 |

(Continued)

OTHER PUBLICATIONS

Machine translation for Japan 2011-240761 (no date).*

(Continued)

*Primary Examiner* — Steven D Maki
(74) *Attorney, Agent, or Firm* — Thorpe North & Western

(57) ABSTRACT

In a pneumatic tire, land portions have a plurality of sipes and at least one row of land portions in an inner side region is provided with sipes having a 3D structure. Also, the snow traction index (STI) with respect to the tire circumferential direction throughout the entire tread portion is in the range of $100 \leq STI$. Also, the sipe component (STI_s_out) of the snow traction index (STI) in an outer side region and the sipe component (STI_s_in) of the snow traction index (STI) in the inner side region have the relationship of $1.1 \leq STI\_s\_in/STI\_s\_out$. Also, the peripheral length ratio PLR_out of the three-dimensional structure portion in the outer side region and the peripheral length ratio PLR_in of the three-dimensional structure portion in the inner side region have the relationship of $1.1 \leq PLR\_in/PLR\_out$.

22 Claims, 7 Drawing Sheets

(51) Int. Cl.
   *B60C 11/13* (2006.01)
   *B60C 11/03* (2006.01)
(52) U.S. Cl.
   CPC ... *B60C 11/1392* (2013.01); *B60C 2011/0346* (2013.01); *B60C 2011/0348* (2013.01); *B60C 2011/0353* (2013.01); *B60C 2011/1209* (2013.01); *B60C 2011/129* (2013.01); *B60C 2011/1213* (2013.01); *B60C 2011/1227* (2013.01); *B60C 2011/1295* (2013.01)

(56) References Cited

U.S. PATENT DOCUMENTS

| | | | |
|---|---|---|---|
| 2003/0029537 A1* | 2/2003 | Iwamura | B60C 11/12 152/209.18 |
| 2006/0016533 A1* | 1/2006 | Ohashi | B60C 11/12 152/151 |
| 2008/0156405 A1* | 7/2008 | Tanabe | B60C 11/11 152/209.18 |
| 2010/0224297 A1* | 9/2010 | Kiwaki | B60C 11/11 152/209.23 |
| 2012/0261045 A1* | 10/2012 | Matsushita | B60C 11/1392 152/209.18 |

FOREIGN PATENT DOCUMENTS

| | | | |
|---|---|---|---|
| JP | H04-085113 | | 3/1992 |
| JP | 04-212604 A | * | 8/1992 |
| JP | H05-112104 | | 5/1993 |
| JP | 2000-280712 | | 10/2000 |
| JP | 2005-041393 | | 2/2005 |
| JP | 2005-041393 A | * | 2/2005 |
| JP | 2005-162197 | | 6/2005 |
| JP | 2005-162197 A | * | 6/2005 |
| JP | 2005-170308 A | * | 6/2005 |
| JP | 2006-069440 | | 3/2006 |
| JP | 2006-192929 | | 7/2006 |
| JP | 2006-192929 A | * | 7/2006 |
| JP | 2007-131222 A | * | 5/2007 |
| JP | 2007-153104 A | * | 6/2007 |
| JP | 2008-132810 | | 6/2008 |
| JP | 2010-254155 | | 11/2010 |
| JP | 2011-240761 A | * | 12/2011 |
| JP | 2012-218633 | | 11/2012 |

OTHER PUBLICATIONS

Machine translation for Japan 04-212604 (no date).*
Machine translation for Japan 2005-170308 (no date).*
Machine translation for Japan 2005-162197 (no date).*
Machine translation for Japan 2005-041393 (no date).*
Machine translation for Japan 2006-192929 (Year: 2018).*
Machine translation for Japan 2007-153104 (Year: 2018).*
Machine translation for Japan 2007-131222 (Year: 2018).*
Machine translation for Japan 2011-240761 (Year: 2018).*
International Search Report dated May 21, 2013, 4 pages, Japan.

* cited by examiner

| | Conventional Example | Comparative Example 1 | Comparative Example 2 | Comparative Example 3 | Working Example 1 | Working Example 2 | Working Example 3 | Working Example 4 | Working Example 5 | Working Example 6 | Working Example 7 |
|---|---|---|---|---|---|---|---|---|---|---|---|
| Basic tread pattern | FIG. 2 | FIG. 2 | FIG. 2 | FIG. 2 | FIG. 2 | FIG. 2 | FIG. 2 | FIG. 2 | FIG. 2 | FIG. 2 | FIG. 5 |
| STI_s_out | 40 | 60 | 40 | 20 | 20 | 30 | 20 | 20 | 20 | 20 | 20 |
| STI_s_in | 40 | 60 | 40 | 40 | 40 | 40 | 60 | 40 | 40 | 40 | 40 |
| STI_s_in/ STI_s_out | 1.0 | 1.0 | 1.0 | 2.0 | 2.0 | 1.3 | 3.0 | 2.0 | 2.0 | 2.0 | 2.0 |
| PLR_out | 1.0 | 1.0 | 0.5 | 1.0 | 0.5 | 0.5 | 0.5 | 0.3 | 0.7 | 0.8 | 0.5 |
| PLR_in | 1.0 | 1.0 | 0.5 | 1.0 | 0.7 | 0.7 | 0.7 | 1.0 | 1.0 | 1.0 | 0.7 |
| PLR_in/ PLR_out | 1.0 | | | 1.0 | 1.4 | 1.4 | 1.4 | 3.3 | 1.4 | 1.3 | 1.4 |
| Uneven wear resistance performance | 100 | 100 | 95 | 95 | 110 | 105 | 105 | 105 | 105 | 100 | 110 |
| Steering stability performance | 100 | 90 | 95 | 105 | 110 | 105 | 105 | 105 | 105 | 105 | 115 |

FIG. 7

PNEUMATIC TIRE

TECHNICAL FIELD

The present technology relates to a pneumatic tire, and in particular to a pneumatic tire with improved uneven wear resistance performance.

BACKGROUND

The steering stability in recent pneumatic tires has been improved by making sipe structures different in an outer side region in the vehicle width direction and an inner side region in the vehicle width direction when the tire is mounted on a vehicle. The techniques described in Japanese Unexamined Patent Application Publication Nos. 2005-41393A and 2006-69440A are conventional pneumatic tires using such sipe structures.

However, a problem arises that uneven wear resistance performance is made worse due to a difference in rigidity on the right and left sides of the tire in such conventional pneumatic tires.

SUMMARY

The present technology provides a pneumatic tire with improved tire uneven wear resistance performance.

A pneumatic tire according to the present technology is provided with a plurality of circumferential main grooves that extend in the tire circumferential direction, and a plurality of land portions partitioned by the circumferential main grooves in a tread portion, wherein, when a first region of the tread portion that borders a tire equatorial plane is called an inner side region and a second region is called an outer side region, the land portions each have a plurality of sipes, at least one row of the land portions in the inner side region is provided with the sipes having a three-dimensional structure portion, a snow traction index STI in the tire circumferential direction for the entire tread portion has a range of 100≤STI and a sipe component STI_s_out of the snow traction index STI in the outer side region and a sipe component STI_s_in of the snow traction index STI in the inner side region have the relationship of 1.1≤STI_s_in/STI_s_out, and a peripheral length ratio PLR_out of the three-dimensional structure portion in the outer side region and a peripheral length ratio PLR_in of the three-dimensional structure portion in the inner side region have the relationship of 1.1≤PLR_in/PLR_out.

Tire performance on snow of the pneumatic tire according to the present technology is ensured due to the STI being equal to or greater than 100. Moreover, rigidity of the land portions in the outer side region is ensured due to the relationship of 1.1≤STI_s_in/STI_s_out. Conversely, rigidity of the land portions in the inner side region is ensured due to the relationship of 1.1≤PLR_in/PLR_out. As a result, there is an advantage that a balance between the rigidity of the land portions in the outer side region and the rigidity of the land portion in the inner side region is achieved and uneven wear resistance performance of the tire is improved.

BRIEF DESCRIPTION OF THE DRAWINGS

FIG. 7 is a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, the multiple modified examples described in the embodiment can be combined as desired within the scope apparent to a person skilled in the art.

Pneumatic Tire

Figure 1:
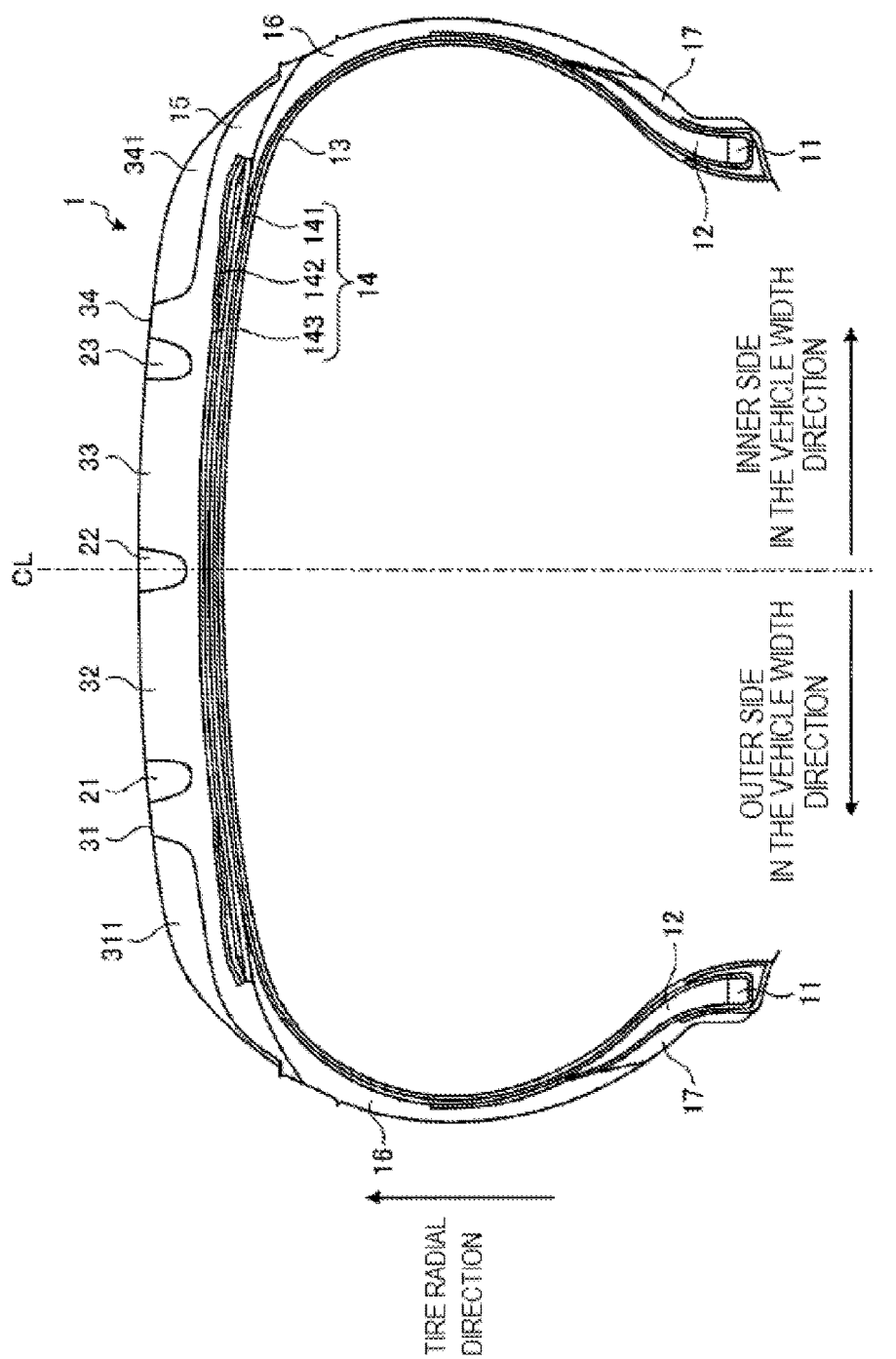
FIG. 1 is a cross-sectional view in a tire meridian direction illustrating a pneumatic tire according to an embodiment of the present technology.

FIG. 1 is a cross-sectional view in a tire meridian direction illustrating a pneumatic tire 1 according to an embodiment of the present technology. This drawing illustrates a radial tire for use on a passenger car as an example of the pneumatic tire 1. Note that the symbol CL refers to a tire equator plane.

A pneumatic tire 1 includes a pair of bead cores 11, 11, a pair of bead fillers 12, 12, a carcass layer 13, a belt layer 14, tread rubber 15, a pair of side wall rubbers 16, 16, and a pair of bead rubbers 17, 17 (see FIG. 1).

The pair of bead cores 11, 11 have annular structures and constitute cores of left and right bead portions. The pair of bead fillers 12, 12 is disposed on a periphery of each of the pair of bead cores 11, 11 in the tire radial direction so as to reinforce the bead portions.

The carcass layer 13 has a single-layer structure, and stretches between the left and right bead cores 11, 11 in toroidal form, forming a framework for the tire. Additionally, both ends of the carcass layer 13 are folded toward an outer side in the tire width direction so as to envelop the bead cores 11 and the bead fillers 12, and fixed. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a pair of cross belts 141, 142, and a belt cover 143, disposed on the periphery of the carcass layer 13. The pair of intersecting belts 141, 142 are constituted by a plurality of belt cords formed from steel or organic fibers, covered by coating rubber, and subjected to a rolling process, having a belt angle, as an absolute value, of not less than 10° and not more than 30°. Further, each of the belts of the pair of intersecting belts 141, 142 has a belt angle (inclination angle in the fiber direction of the belt cord with respect to the tire circumferential direction) denoted with a mutually different symbol, and the belts are stacked so as to intersect each other in the belt cord fiber directions (crossply configuration). The belt cover 143 is configured by a plurality of belt cords formed from steel or organic fibers, covered by coating rubber, and subjected to a rolling process, having a belt angle, as an absolute value, of no less than 10° and no more than 45°. Also, the belt cover 143 is disposed so as to be laminated on the outer side in the tire radial direction of the cross belts 141, 142.

The tread rubber 15 is disposed on an outer circumference in the tire radial direction of the carcass layer 13 and the belt layer 14, and forms a tread portion of the tire. The pair of side wall rubbers 16, 16 is disposed on each outer side of the carcass layer 13 in the tire width direction, so as to form left and right sidewall portions of the tire. A pair of bead rubbers 17, 17 is disposed on each outer side of the left and right bead cores 11, 11 and the bead fillers 12, 12 in the tire width direction so as to form left and right bead portions of the tire.

Figure 2:
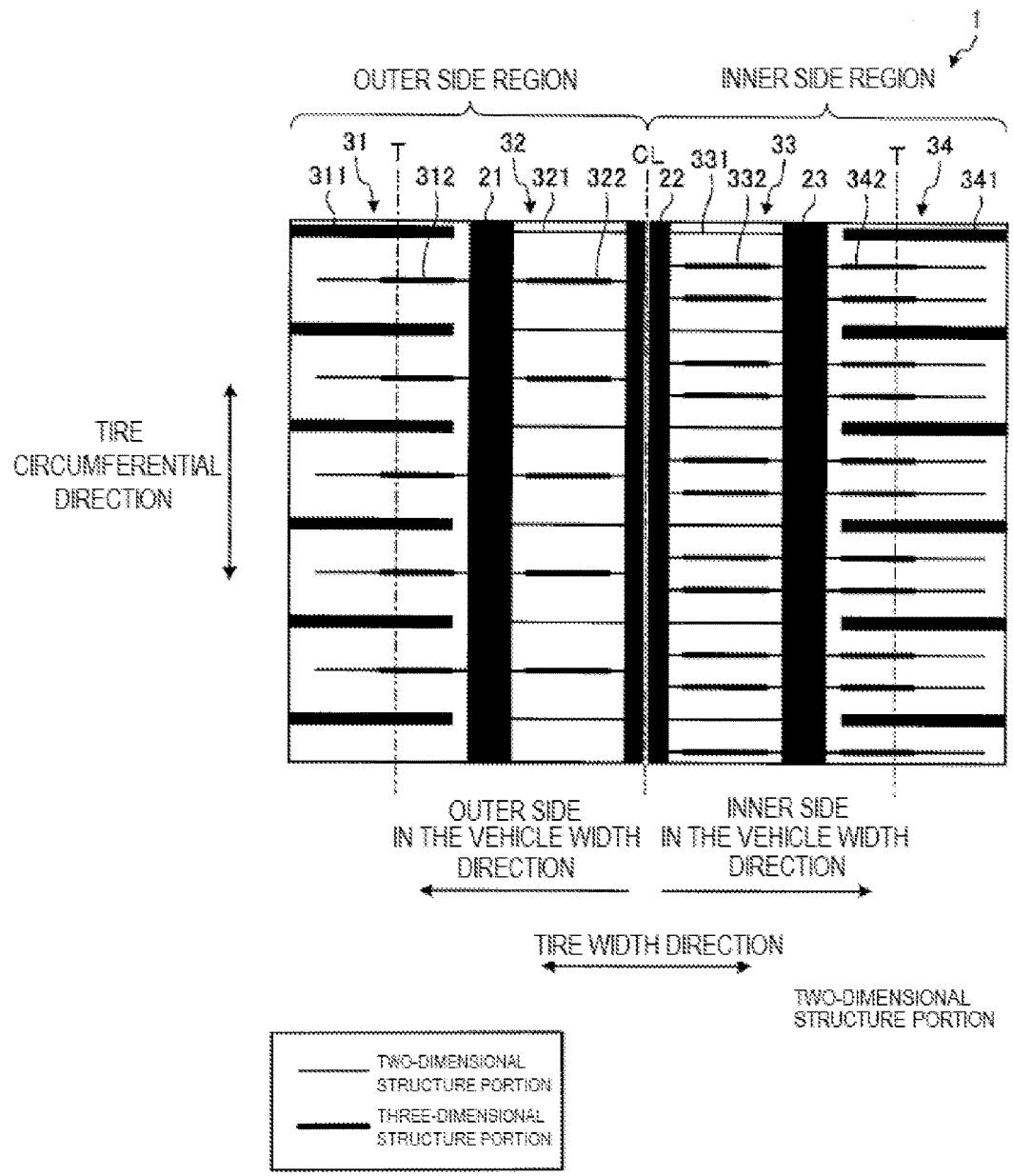
FIG. 2 is a plan view illustrating a tread surface of the pneumatic tire depicted in FIG. 1.

FIG. 2 is a plan view illustrating a tread surface of the pneumatic tire 1 depicted in FIG. 1. FIG. 2 illustrates a general tread pattern based on ribs. The symbol T refers to a ground contact edge in FIG. 2.

Additionally, the pneumatic tire 1 includes a plurality of circumferential main grooves 21 to 23 extending in the tire circumferential direction, and a plurality of land portions 31 to 34 partitioned by the circumferential main grooves 21 to 23 in the tread portion (see FIG. 2).

For example, three circumferential main grooves 21 to 23 having a straight shape are disposed so as to have left-right symmetry with respect to the tire equatorial plane CL in the configuration in FIG. 2. The pair of center land portions 32, 33 and the pair of left and right shoulder land portions 31, 34 are partitioned by these circumferential main grooves 21 to 23. Each of the shoulder land portions 31, 34 has a plurality of lug grooves 311, 341 that extend in the tire width direction. These lug grooves 311, 341 have a semi-closed structure that terminates at one edge inside the respective shoulder land portions 31, 34, and are arranged with a predetermined interval in the tire circumferential direction. The center land portions 32, 33 do not have lug grooves. Therefore, the land portions 31 to 34 are formed as continuous ribs in the tire circumferential direction. As a result, a rib pattern is formed.

Note that "circumferential main grooves" refers to circumferential grooves having a groove width of 5.0 mm or greater. Moreover, "lug grooves" refers to lateral grooves having a groove width of 1.5 mm or greater. The below-mentioned "sipes" are notches formed in the land portions and have a sipe width of less than 1.5 mm.

As described above, the pneumatic tire 1 has a tread pattern based on ribs in the configuration in FIG. 2. However, without being limited as such, the pneumatic tire 1 may have a block pattern (not illustrated in the drawings) due to a portion or all of the land portions 31 to 34 having lug grooves with an open structure. Mounting direction of the tire on a vehicle A first region in the tread portion bordered by the tire equatorial plane is called an inner side region, and a second region is called an outer side region.

The pneumatic tire 1 has an indicator designating the mounting direction (not illustrated in the drawings) on a vehicle wherein the inner side region is on the inner side in the vehicle width direction. Note that the indicator of the mounting direction can be displayed, for example, by marks or recesses and protrusions provided on the side wall portion of the tire, or in a catalog that is attached to the tire.

Sipe Disposition Structure

Each of the land portions 31 to 34 in the pneumatic tire 1 has a plurality of sipes 312, 321, 322, 331, 332, and 342 (see FIG. 2).

The sipes 312 to 342 are categorized into two-dimensional sipes made up solely of a two-dimensional structure portion, and three-dimensional sipes (having a three-dimensional structure portion in one portion, or made up solely of a three-dimensional structure portion) having a three-dimensional structure portion. The "two-dimensional structure portion" refers to a sipe portion having a linear sipe wall face as seen in a vertical cross-section in the sipe length direction. The "three-dimensional structure portion" refers to a sipe portion having a sipe wall face with a curved shape in the sipe width direction as seen in a vertical cross-section in the sipe length direction. Compared to the two-dimensional structure portion, the three-dimensional structure portion has a greater mating force between opposing sipe wall faces and, therefore, act to reinforce rigidity of the land portions.

The thin lines indicate a two-dimensional structure portion and the thick lines indicate a three-dimensional structure portion among the sipes 312 to 342 in FIG. 2.

Figure 3:
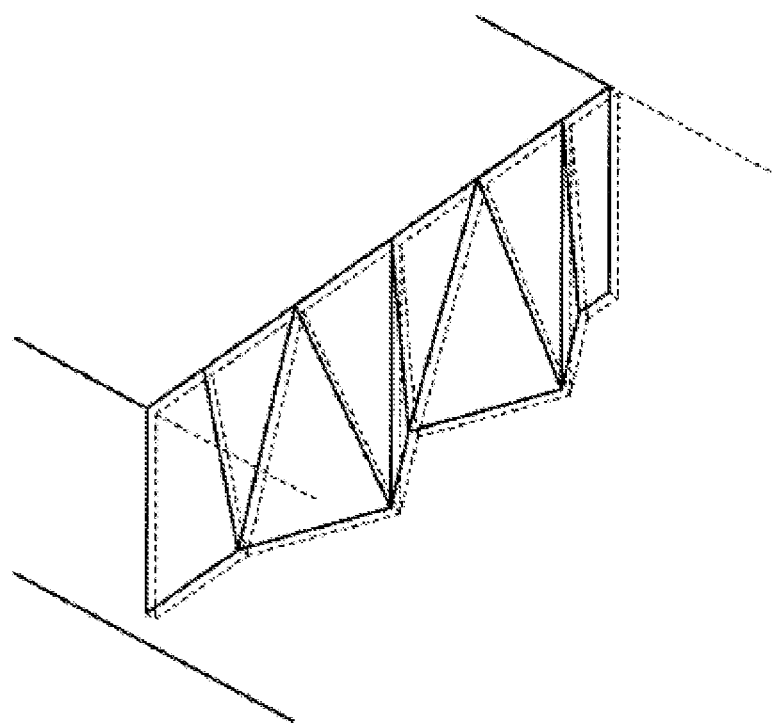
FIG. 3 is a view for explaining an example of a three-dimensional sipe.
Figure 4:
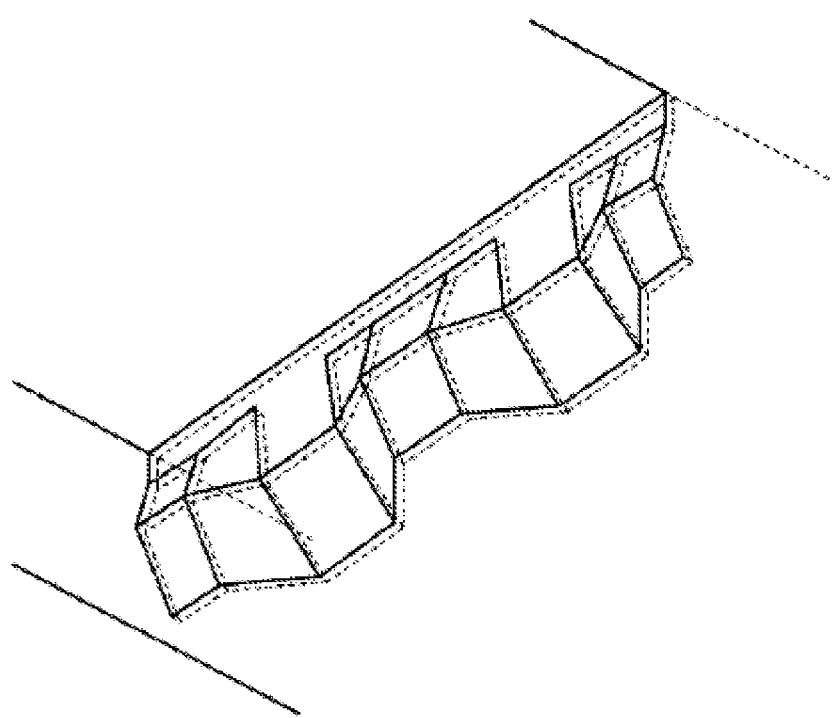
FIG. 4 is a view for explaining an example of a three-dimensional sipe.

FIGS. 3 and 4 are explanatory views illustrating an example of a three-dimensional sipe. FIGS. 3 and 4 illustrate a transparent perspective view of one wall face of a three-dimensional sipe. The three-dimensional sipe in FIG. 3 has an open structure that is open at both end portions of the land portion, or has the three-dimensional structure portion in a center portion and has the two-dimensional structure portion at both end portions. The three-dimensional sipe in FIG. 4 has an open structure that is open to both end portions of the land portion, or is only configured by the three-dimensional structure portion.

The three-dimensional sipe in FIG. 3 has an opening that has a linear shape or an arc shape as seen in a plan view of the road contact surface of the land portion. The three-dimensional sipe has a corrugated shape in which a curved line or a bent line repeats from a first end to a second end while the amplitude gradually increases as the sipe depth increases from the opening down to a wear position of at least 80% of the land portion. Moreover, when perpendicular lines are drawn to a predetermined sipe depth position from both ends of the three-dimensional sipe to a center line that passes through the center of the amplitude of the corrugated shape of the three-dimensional sipe, the distance between the feet of these lines is referred to as the sipe length L (not illustrated in the drawings). The sipe length L becomes correspondingly shorter as the sipe depth increases. Moreover, when a periphery length (actual length) of a sipe at the road contact surface of the land portion is M0 mm, and the sipe length L at the 80% wear position is L80 mm, the periphery length of the sipe at the 80% wear position is M80 mm (not illustrated in the drawings). In this case, the ratio L80/M0 and the ratio M80/M0 satisfy the conditions of $0.85 \leq L80/M0 \leq 0.90$ and $1.0 \leq M80/M0 \leq 1.15$. This type of three-dimensional sipe is a known technique that is described, for example, in Japanese Unexamined Patent Application Publication No. 2006-56502.

The three-dimensional sipe in FIG. 4 has a first offset portion that protrudes toward a first side in the sipe width direction, and a second offset portion that protrudes toward a second side in the sipe width direction at a position further to the inner side in the tire radial direction than the first offset portion. Moreover, a sipe length L1 (not illustrated in the drawings) for a brand-new tire and a sipe length L2 (not illustrated in the drawings) at 80% wear have the relationship of being substantially the same ($0.95 \leq L2/L1 \leq 1.05$). A periphery length M1 (not illustrated in the drawings) of a sipe for a brand-new tire and a periphery length M2 (not illustrated in the drawings) of a sipe at 80% wear have the relationship of $1.10 \leq M2/M2 \leq 1.50$. A planar form of a sipe at 80% wear has a parallel portion that is parallel to the planar form of the sipe for a brand-new tire. A total length P2(not illustrated in the drawings) of the parallel portion and the sipe length L1 for a brand-new tire has the relationship of 0.20≤P2/L1≤0.80. This type of three-dimensional sipe is a known technique that is described, for example, in Japanese Unexamined Patent Application Publication No. 2009-255688.

Moreover, the snow traction index (STI) of the pneumatic tire 1 with respect to the tire circumferential direction (the so-called 0° snow traction index) throughout the entire tread portion (both the outer side region and the inner side region) is in the range of 100≤STI≤160.

The snow traction index STI with respect to the tire circumferential direction is an empirical formula by Uniroyal Inc. proposed by the Society of Automotive Engineers (SAE) and is defined by the following formula. In the formula, ρg is a groove density (mm/mm²) and is calculated as a ratio between the groove length of all the grooves (all grooves except sipes) projected in the tire circumferential direction on the tire ground contact patch and the tire ground contact patch surface area. Moreover, ρs is a sipe density (mm/mm²) and is calculated as a ratio between the sipe length of all the sipes projected in the tire circumferential direction on the tire ground contact patch and the tire ground contact patch surface area. Furthermore, Dg is an average value of the groove length of all the grooves projected in the tire circumferential direction on the tire ground contact patch.

$$STI = -6.8 + 2202 \times \rho g + 672 \times \rho s + 7.6 \times Dg$$

Note that the "tire ground contact patch" refers to the contact surface between the tire and a flat plate in a configuration in which the tire is assembled on a regular rim, filled to a prescribed internal pressure, placed perpendicularly with respect to the flat plate in a static state, and loaded with a load corresponding to a prescribed load.

Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Further, a sipe component STI_s_out of the snow traction index STI in an outer side region and a sipe component STI_s_in of the snow traction index STI in the inner side region have the relationship of 1.1≤STI_s_in/STI_s_out≤3.0. The sipe components STI_s_out and STI_s_in preferably have the relationship of 1.5<STI_s_in/STI_s_out≤2.5.

A peripheral length ratio PLR_out of the three-dimensional structure portion in the outer side region and a peripheral length ratio PLR_in of the three-dimensional structure portion in the inner side region have the relationship of 1.1≤PLR_in/PLR_out≤4.0. The peripheral length ratios PLR_out and PLR_in preferably have the relationship of 1.5≤PLR_in/PLR_out≤3.0.

The "peripheral length ratio" of the three-dimensional structure portion refers to a ratio between the sum total of the periphery lengths of the three-dimensional structure portion and the sum total of the periphery lengths of the sipes. The periphery length refers to the length at the tire ground contact patch. For example, when a sipe has an arc shape or a linear shape, the length of the lines is the periphery length, and when the sipe has a corrugated shape, the length of a center line of the amplitude is the periphery length. The periphery length of a sipe is measured for the entire sipe and is the sum total of the periphery length of the three-dimensional structure portion and the periphery length of the two-dimensional structure portion.

Moreover, the peripheral length ratio PLR_out of the three-dimensional structure portion in the outer side region in the pneumatic tire 1 preferably is in a range of 0≤PLR_out≤0.7. In this case, PLR_out=0 refers to the fact that the sipes in the land portions 31, 32 in the outer side region are configured only by flat sipes.

Moreover, the peripheral length ratio PLR_in of the three-dimensional structure portion in the inner side region in the pneumatic tire 1 preferably is in a range of 0.5≤PLR_in≤1.0. In this case, PLR_in=1.0 refers to the fact that the sipes in the land portions 33, 34 in the inner side region are all configured with three-dimensional structure portions.

Moreover, the peripheral length ratio PLR_in of the three-dimensional structure portion in the inner side region and the peripheral length ratio PLR_out of the three-dimensional structure portion in the outer side region in the pneumatic tire 1 preferably are in a range of 0.6≤PLR_in≤0.8 and 0.4≤PLR_out≤0.6.

For example, the pneumatic tire 1 is provided with the three circumferential main grooves 21 to 23 having a straight shape in the configuration in FIG. 2, and the circumferential main grooves 21 to 23 are disposed so as to have right-left symmetry with respect to the tire equatorial plane CL. Moreover, all of the land portions 31 to 34 respectively have the respective sipes 312 to 342. Disposal pitches of the sipes 331, 332, and 342 in the land portions 33 and 34 in the inner side region are set to be narrower than the disposal pitches of the sipes 312, 321, and 322 in the land portions 31, 32 in the outer side region. As a result, the sipe component STI_s_out of the snow traction index STI in the outer side region and the sipe component STI_s_in of the snow traction index STI in the inner side region are set to the relationship of STI_s_out<STI_s_in.

Moreover, the two-dimensional sipes 321, 331 made up solely of the two-dimensional structure portion and the three-dimensional sipes 312, 322, 332, and 342 having the three-dimensional structure portion in the center portion are disposed in a mixed manner. Moreover, all of the land portions 31 to 34 respectively have the plurality of three-dimensional sipes 312, 322, 332, and 342. Specifically, the sipes in the left and right shoulder land portions 31, 34 are all configured by the three-dimensional sipes 312, 342. The sipes in the left and right center land portions 32, 33 are configured by both the two-dimensional sipes 321, 331 and by the three-dimensional sipes 322, 332. A disposal ratio of the three-dimensional sipes 332 in the center land portion 33 in the inner side region is set to be higher than a disposal ratio of the three-dimensional sipes 322 in the center land portion 32 in the outer side region. As a result, the peripheral length ratio PLR_out of the three-dimensional structure portion in the outer side region and the peripheral length ratio PLR_in of the three-dimensional structure portion in the inner side region are set to have the relationship of PLR_out<PLR_in.

Moreover, the periphery length of the three-dimensional structure portion is set as described below. Specifically, the peripheral length ratio PLR_out_sh of the three-dimensional structure portions in the shoulder land portion 31 in the outer side region and the peripheral length ratio PLR_in_sh of the three-dimensional structure portion in the shoulder land portion 34 in the inner side region have the relationship of 1.1≤PLR_in_sh/PLR_out_sh Tire snow performance of the pneumatic tire 1 is ensured due to the STI being equal to or greater than 100. The rigidity of the land portions 31, 32 in the outer side region is ensured due to STI_s_out<STI_s_in. Conversely, rigidity in the land portions 33, 34 of the inner side region is ensured due to the relationship of PLR_out<PLR_in. As a result, the balance between the rigidity of the land portions 31, 32 in the outer side region and the rigidity of the land portions 33, 34 in the inner side region is achieved and uneven wear resistance performance and steering stability performance of the tire is improved.

A groove area ratio SG in the tire ground contact patch in the pneumatic tire 1 is preferably in a range of 0.25≤SG≤0.40. As a result, the groove area ratio SG is optimized.

The groove area ratio is defined as groove area/(groove area+ground contact area). "Groove area" refers to the opening area of the grooves in the contact patch. Moreover, a "groove" refers to a circumferential direction groove, a narrow groove or a lug groove in the tread portion, and does not include sipes and kerfs. "Ground contact area" refers to the contact area between the tire and the contact patch. Note that the groove area and the ground contact area are measured at a contact surface between a tire and a flat plate in a configuration in which the tire is assembled on a standard rim, filled to a prescribed internal pressure, placed perpendicularly with respect to the flat plate in a static state, and loaded with a load corresponding to a prescribed load.

Moreover the sipes 321, 322, 331, and 332 in the center land portions 32, 33 in the configuration in FIG. 2 have an open structure that passes through the land portions 32, 33, and the sipes 312, 342 in the left and right shoulder land portions 31, 34 have a semi-closed structure that is open at a first end portion to the circumferential main grooves 21, 23 and that terminates inside the land portions 31, 34 at a second end portion. However, without being limited as such, the sipes 312 to 342 in the land portions 31 to 34 may have an open structure, a semi-closed structure, or may have a closed structure that terminates at both end portions inside the land portions 31 to 34 (not illustrated in the drawings).

Moreover, all of the land portions 31 to 34 in the configuration in FIG. 2 are respectively provided with the plurality of three-dimensional sipes 312, 322, 332, and 342 having the three-dimensional structure portion. However, at least one of the land portions 33 and 34 in the inner side region may be provided with sipes having the three-dimensional structure portion. Therefore, the land portions 31 and 32 in the outer side region may be provided with sipes made up solely of the two-dimensional structure portion (not illustrated in the drawings).

Further, all of the three-dimensional sipes (sipes having the three-dimensional structure portion) 312, 322, 332, and 342 in the configuration in FIG. 2 have the three-dimensional structure portion in the center portion of the sipe and have the two-dimensional structure portion at both end portions of the sipe. With this configuration, there is an advantage that the sipe molding die manufacturing process is made easier due to the two-dimensional structure portion being at both end portions of the sipe.

Moreover, all of the sipes 312 to 342 in the configuration in FIG. 2 have a linear shape as seen in a plan view of the tread portion. However, without being limited as such, a portion or all of the sipes may have an arc shape (see FIG. 5 below), or may have a zigzag shape or a corrugated shape (not illustrated in the drawings).

MODIFIED EXAMPLES

Figure 5:
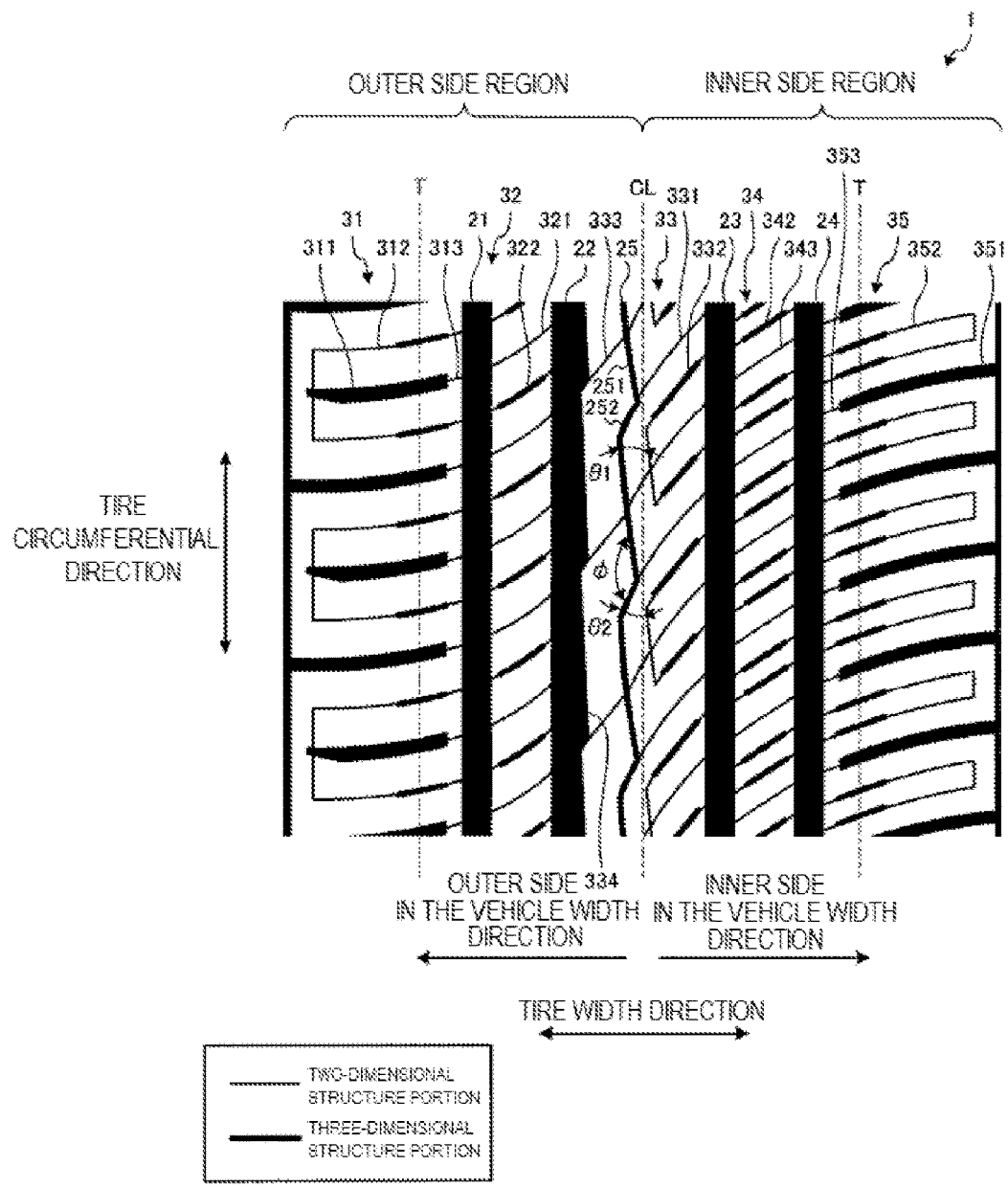
FIG. 5 is an explanatory view illustrating a modified example of the pneumatic tire depicted in FIG. 1.

FIG. 5 is an explanatory view illustrating Modified Example of the pneumatic tire 1 depicted in FIG. 1. FIG. 5 illustrates a tread pattern for an all-season radial tire for a passenger vehicle. An all-season tire is expected to have both superior uneven wear resistance performance on non-snow-covered roads and superior anti-lateral skid performance and traction performance on snow-covered roads.

For example, the pneumatic tire 1 is provided with four circumferential main grooves 21 to 24 having a straight shape in the modified example in FIG. 5, and the circumferential main grooves 21 to 24 are disposed so as to have right-left symmetry with respect to the tire equatorial plane CL. The circumferential main grooves 21 to 24 are partitioned by five rows of land portions 31 to 35. Here, the land portion 33 on the tire equatorial plane CL is called a center land portion, the right and left pair of land portions 32, 34 adjacent to the land portion 33 are called second land portions, and the right and left pair of land portions 31, 35 positioned on the outer side of the land portions 32, 34 are called the shoulder land portions.

The left and right shoulder land portions 31, 35 respectively have a plurality of lug grooves 311, 351 that extend in the tire width direction. The lug grooves 311, 351 have a closed structure that terminates inside the respective shoulder land portions 31, 35, and are arranged with a predetermined interval in the tire circumferential direction. The lug grooves 311, 315 have an arc shape and extend while an angle of inclination (angle formed by the tire circumferential direction and a tangent line of the arc shape) with respect to the tire circumferential direction increases from the tire equatorial plane CL toward the outer side in the tire width direction. The lug groove 311 of the shoulder land portion 31 in the outer side region and the lug groove 351 of the shoulder land portion 35 in the inner side region are curved so as to protrude in mutually different directions with respect to the tire circumferential direction. The land portions 31 to 35 are formed as continuous ribs in the tire circumferential direction. As a result, a rib pattern not having right-left symmetry is formed.

Moreover, the center land portion 33 has a narrow groove 25. The narrow groove 25 has a zigzag shape and extends in the tire circumferential direction without opening to the right or left edge portions of the center land portion 33 and thus divides the center land portion 33 into two portions in the tire width direction. The groove width of the narrow groove 25 is set to be not less than 1.5 mm and not more than 4.0 mm or preferably not less than 1.6 mm and not more than 4.0 mm. The groove depth of the narrow groove 25 is set to be less than 7 mm. The groove area ratio SG in the tire ground contact patch is set to be SG=0.25.

Moreover, the narrow groove 25 has a zigzag shape that is formed by a long first narrow groove portion 251 and a short second narrow groove portion 252 that continue in an alternating manner. The first narrow groove portion 251 and the second narrow groove portion 252 are inclined in mutually different directions with respect to the tire circumferential direction. An angle of inclination θ1 with respect to the tire circumferential direction of the first narrow groove portion 251 and an angle of inclination θ2 with respect to the tire circumferential direction of the second narrow groove portion 252 satisfy the conditions of 0°≤θ1≤30° and 10°≤θ2≤45°, and θ1<θ2. At this time, an angle φ formed by the first narrow groove portion 251 and the second narrow groove portion 252 is preferably within a range of 100°≤φ≤160°.

The land portions 31 to 35 respectively have the plurality of sipes 312, 313, 321, 322, 331 to 333, 343, 342, 352, and 353. Disposal pitches of the sipes 343, 342, and 352 in the land portions 34, 35 in the inner side region are set to be narrower than the disposal pitches of the sipes 312, 321, and 322 in the land portions 31, 32 in the outer side region. The disposal pitches of the sipes 331, 332 on the inner side region side of the narrow groove 25 are set to be narrower than the disposal pitch of the sipe 333 on the outer side region side of the narrow groove 25 in the center land portion 33. As a result, the sipe component STI_s_out of the snow traction index STI in the outer side region and the sipe component STI_s_in of the snow traction index STI in the inner side region are set to have the relationship of 1.1≤STI_s_in/STI_s_out (preferably, 1.1≤STI_s_in/STI_s_out≤3.0).

The sipes 312 to 353 have an arc shape and extend while an angle of inclination with respect to the tire circumferential direction increases from the tire equatorial plane CL toward the outer side in the tire width direction. Moreover, the sipes 312, 313, 321, 322, and 333 in the outer side region and the sipes 331, 332, 343, 342, 352, and 353 in the inner side region are curved so as to protrude in mutually different directions with respect to the tire circumferential direction. In this case, the angle of inclination with respect to the tire circumferential direction of the sipes 331, 332 in the center land portion 33 on the inner side region side of the narrow groove 25 and the angle of inclination θ2 of the second narrow groove portion 252 are preferably the same.

The sipes 312, 313 in the shoulder land portion 31 and the sipes 321, 322 in the second land portion 32 in the outer side region are disposed with the same pitch, and opposing sipes 312, 322 and 313, 321 between the land portions 31, 32 are disposed so as to follow the same arc. Similarly, the sipes 352, 353 in the shoulder land portion 35 and the sipes 343, 342 in the second land portion 34 in the inner side region are disposed with the same pitch, and opposing sipes 352, 342 and 353, 343 between the land portions 34 and 35 are disposed so as to follow the same arc. The sipes 331 to 333 are placed in the center land portion 33 a plurality of times and are set to decrease in number so as to be less than the number of sipes in the other land portions 31, 32, 34, and 35. The sipe 333 in the center land portion 33 on the outer side region side of the narrow groove 25 and a portion of the sipe 321 in the second land portion 32 in the outer side region are disposed so as to follow the same arc. Similarly, the sipes 331, 332 in the center land portion 33 on the inner side region side of the narrow groove 25 and a portion of the sipe 343 in the second land portion 34 in the inner side region are disposed so as to follow the same arc.

Moreover, the two-dimensional sipes 313, 321, 331, 333, 343, and 353 that are made up solely of the two-dimensional structure portion and the three-dimensional sipes 312, 322, 332, 342, and 352 having the three-dimensional structure portion in the center portion are disposed in a mixed manner. Moreover, all of the land portions 31 to 35 respectively have the plurality of three-dimensional sipes 312, 322, 332, 342, and 352. Specifically, the sipes 312 and 352 having the three-dimensional structure portion are disposed between adjacent lug grooves 311, 311 and 351, 351 in the left and right shoulder land portions 31, 35. Moreover, the sipes are respectively configured from both of the two-dimensional sipes 321, 331, 333, and 343 and the three-dimensional sipes 322, 332, and 342 in the center land portion 33 and the left and right second land portions 32, 34. A disposal ratio of the three-dimensional sipes 342 in the second land portion 34 in the inner side region is set to be higher than a disposal ratio of the three-dimensional sipes 322 in the second land portion 32 in the outer side region. The three-dimensional sipe 322 is only disposed on the inner side region side of the narrow groove 25 in the center land portion 33. As a result, the peripheral length ratio PLR_out of the three-dimensional structure portion in the outer side region and the peripheral length ratio PLR_in of the three-dimensional structure portion in the inner side region are set to have the relationship of PLR_out<PLR_in. Only the two-dimensional sipes 313, 321, 333, 353, 343, and 331 are disposed on extension lines of the lug grooves 311, 351 in the shoulder land portions 31, 35.

Figure 6:
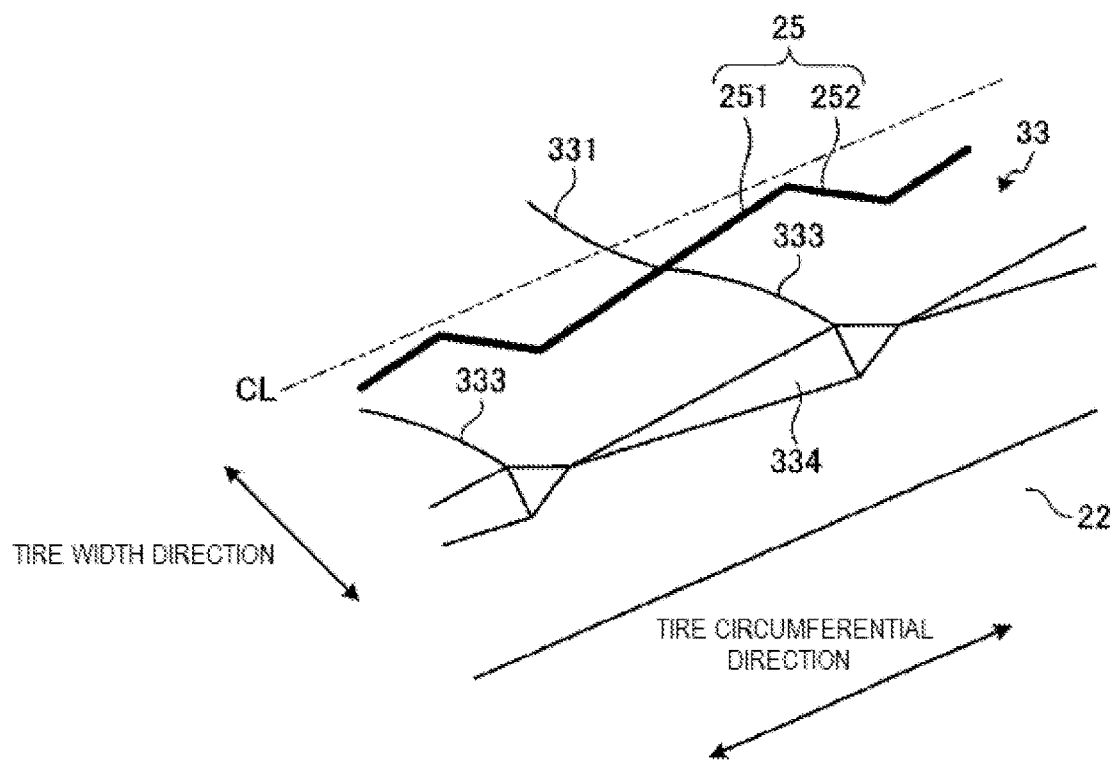
FIG. 6 is a perspective view illustrating a chamfered portion of a center land portion of the pneumatic tire depicted in FIG. 5.

FIG. 6 is a perspective view illustrating a chamfered portion 334 of the center land portion 33 of the pneumatic tire 1 described in FIG. 5. FIG. 6 illustrates an edge portion on the outer side region side of the center land portion 33.

The center land portion 33 in the modified example in FIG. 6 has a chamfered portion 334. The chamfered portion 334 is formed in the edge portion on the outer side region side and the chamfer width has a cyclical and sawtooth-wave pattern that increases and decreases in the tire circumferential direction. As a result, edge components in the outer side region are increased. Moreover, the center land portion 33 has the two-dimensional sipe 333 that connects the narrow groove 25 and the edge portion on the outer side region side, and the two-dimensional sipe 333 is connected to a position where the chamfer width of the chamfered portion 334 is the greatest.

Effect

As described above, the pneumatic tire 1 is provided with the plurality of circumferential main grooves 21 to 23 extending in the tire circumferential direction, and the plurality of land portions 31 to 34 partitioned by the circumferential main grooves 21 to 23 in the tread portion (for example, see FIG. 2). The land portions 31 to 34 respectively have the plurality of sipes 312 to 342, and at least one row of the land portions 33 and 34 in the inner side region is provided with the sipes 332, 342 having the three-dimensional structure portion. Also, the snow traction index (STI) in the tire circumferential direction throughout the entire tread portion is in the range of 100≤STI. Further, the sipe component STI_s_out of the snow traction index STI in the outer side region and the sipe component STI_s_in of the snow traction index STI in the inner side region have the relationship of 1.1≤STI_s_in/STI_s_out. Also, the peripheral length ratio PLR_out of the three-dimensional structure portion in the outer side region and the peripheral length ratio PLR_in of the three-dimensional structure portion in the inner side region have the relationship of 1.1≤PLR_in/PLR_out.

With such a configuration, tire snow performance is ensured due to the STI being equal to or greater than 100. Moreover, rigidity of the land portions 31, 32 in the outer side region is ensured due to the relationship of 1.1≤STI_s_in/STI_s_out. Conversely, rigidity in the land portions 33, 34 in the inner side region is ensured due to the relationship of 1.1≤PLR_in/PLR_out. As a result, there is an advantage that a balance between the rigidity of the land portions 31, 32 in the outer side region and the rigidity of the land portions 33, 34 in the inner side region is achieved and uneven wear resistance performance of the tire is improved. There is also an advantage that steering stability performance of the tire is improved.

Moreover, the peripheral length ratio PLR_out of the three-dimensional structure portion in the outer side region in the pneumatic tire 1 is in a range of 0≤PLR_out≤0.7. As a result, there is an advantage that the rigidity of the land portions 3, 32 in the outer side region is appropriately ensured.

Moreover, the peripheral length ratio PLR_in of the three-dimensional structure portion in the inner side region in the pneumatic tire 1 is in a range of 0.5≤PLR_in≤1.0. As a result, there is an advantage that the rigidity of the land portions 33, 34 in the inner side region is appropriately ensured.

Moreover, the peripheral length ratio PLR_in of the three-dimensional structure portion in the inner side region and the peripheral length ratio PLR_out of the three-dimensional structure portion in the outer side region in the pneumatic tire 1 are in a range of 0.6≤PLR_in≤0.8 and 0.4≤PLR_out≤0.6. As a result, there is an advantage that a more optimal balance between the rigidity of the land portions 31, 32 in the outer side region and the rigidity of the land portions 33, 34 in the inner side region is achieved.

The pneumatic tire 1 is provided with three or more circumferential main grooves 21 to 23, and provided with the circumferential main grooves 21 to 23 and the land portions 31 to 34 so as to have right-left symmetry with respect to the tire equatorial plane CL (see FIG. 2). Among the land portions 31 to 34 in this case, the peripheral length ratio PLR_out_sh of the three-dimensional structure portions in the shoulder land portion 31 in the outer side region and the peripheral length ratio PLR_in_sh of the three-dimensional structure portions in the shoulder land portion 34 in the inner side region have the relationship of 1.1≤PLR_in_sh/PLR_out_sh, and the peripheral length ratio PLR_out_ce of the three-dimensional structure portions in the center land portion 32 in the outer side region and the peripheral length ratio PLR_in_ce of the three-dimensional structure portion in the center land portion 33 in the inner side region have the relationship of 1.1≤PLR_in_ce/PLR_out_ce. As a result, the balance between the rigidity of the land portions 31, 32 in the outer side region and the rigidity of the land portions 33, 34 in the inner side region is achieved and uneven wear resistance performance and steering stability performance of the tire are further improved.

All the land portions 31 to 34 in the pneumatic tire 1 respectively have the plurality of sipes 312 to 342, and the disposal pitch of the sipes 331, 332, and 342 in the land portions 33, 34 in the inner side region is narrower than the disposal pitch of the sipes 312, 321, and 322 in the land portions 31, 32 in the outer side region (see FIG. 2). As a result, there is an advantage that snow traction performance of the land portions 33, 34 in the inner side region is improved, and the rigidity of the land portions 31, 32 in the outer side region is appropriately ensured.

Moreover, the sipes 321, 331 that are only made up by the two-dimensional structure portion and the sipes 312, 322, 332, and 342 that have the three-dimensional structure portion are disposed in a mixed manner in the pneumatic tire 1 (see FIG. 2). With such a configuration, by adjusting the disposal ratio of the sipes 312, 322, 332, and 342 having the three-dimensional structure portion, the balance between the rigidity of the land portions 31, 32 in the outer side region and the rigidity in the land portions 33, 34 in the inner side region can be adjusted easily.

Further, the disposal ratio of the sipes 332 having the three-dimensional structure portion in the land portion 33 in the inner side region in the pneumatic tire 1 is higher than the disposal ratio of the sipes 322 having the three-dimensional structure portion in the land portion 32 in the outer side region (see FIG. 2). As a result, there is an advantage that the rigidity of the land portions 33, 34 in the inner side region is appropriately ensured.

The sipes 312, 322, 332, and 342 having the three-dimensional structure portion have the three-dimensional structure portion in the center portion and have the two-dimensional structure portion at both end portions in the pneumatic tire 1. With this configuration, there is an advantage that the sipe molding die manufacturing process is made easier due to the two-dimensional structure portion being at both end portions of the sipes.

Moreover, the land portion 33 on the tire equatorial plane CL in the pneumatic tire 1 has one narrow groove 25 (see FIG. 5). The narrow groove 25 has the zigzag shape that is formed by the first narrow groove portion 251 and the second narrow groove portion 252 continuing in an alternating manner, and extends in the tire circumferential direction to divide the land portion 33 into two portions. The first narrow groove portion 251 and the second narrow groove portion 252 are inclined in mutually different directions with respect to the tire circumferential direction. The angle of inclination θ1 with respect to the tire circumferential direction of the first narrow groove portion 251 and the angle of inclination θ2 with respect to the tire circumferential direction of the second narrow groove portion 252 satisfy the conditions of 0°≤θ1≤30° and 10°≤θ2≤45°, and θ1<θ2. With this configuration, there is an advantage that the edge components in the land portion 33 are increased and the snow traction performance of the tire is improved due to the zigzag shape of the narrow groove 25.

The narrow groove 25 in the pneumatic tire 1 has a groove width of not less than 1.5 mm and not more than 4.0 mm.

Moreover, the land portion 33 on the tire equatorial plane CL in the pneumatic tire 1 has the sipes 331, 332 on the inner side region side of the narrow groove 25 (see FIG. 5).

The sipes 331, 332 on the inner side region side of the narrow groove 25 in the land portion 33 on the tire equatorial plane CL in the pneumatic tire 1 are inclined to the same side with respect to the tire circumferential direction as the second narrow groove portion 252 of the narrow groove 25 (see FIG. 5).

The land portion 33 on the tire equatorial plane CL has the sipe 333 on the outer side region side of the narrow groove 25, and the disposal pitch of the sipes 331, 332 on the inner side region side is narrower than the disposal pitch of the sipes 333 on the outer side region side in the land portion 33 on the tire equatorial plane CL (see FIG. 5).

The sipe 333 on the outer side region side of the narrow groove 25 in the land portion 33 on the tire equatorial plane CL in the pneumatic tire 1 is inclined to the same side with respect to the tire circumferential direction as the second narrow groove portion 252 of the narrow groove 25 (see FIG. 5).

The pair of land portions 31, 32 in the outer side region in the pneumatic tire 1 respectively have the plurality of sipes 312, 313, 321, and 322 having an arc shape (see FIG. 5). Moreover, opposing sipes 312, 322 and 313, 321 between the land portions 31, 32 follow the same arc.

Moreover, the pair of land portions 34, 35 in the inner side region in the pneumatic tire 1 respectively have the plurality of sipes 343, 342, 352, and 353 having an arc shape (see FIG. 5). The opposing sipes 342, 352 and 343, 353 between the land portions 34, 35 follow the same arc. Moreover, the sipes 312, 313, 321, and 322 in the outer side region and the sipes 343, 342, 352, and 353 in the inner side region are disposed so as to protrude in mutually different directions with respect to the tire circumferential direction.

Moreover, the land portion 33 on the tire equatorial plane CL in the pneumatic tire 1 has the chamfered portion 334 on the edge portion on the outer side region side (see FIGS. 5 and 6). The chamfer width of the chamfered portion 334 changes cyclically in the tire circumferential direction.

The groove area ratio SG in the tire ground contact patch in the pneumatic tire 1 is in a range of 0.25≤SG≤0.40. As a result, there is an advantage that the groove area ratio SG is optimized and water drainage performance of the tire is improved.

Additionally, the pneumatic tire 1 has the indicator designating the mounting direction (see FIG. 2) on a vehicle wherein the inner side region is on the inner side in the vehicle width direction. With the configuration described above, the inner side region having the low rigidity is disposed on the inner side in the vehicle width direction and the outer side region having the high rigidity is disposed on the outer side in the vehicle width direction. Such a configuration is advantageous because the inner side region will contribute greatly to the snow steering stability, the outer side region will contribute greatly to the dry steering stability, and both dry steering stability and snow steering stability of the tire will be achieved at high levels.

EXAMPLES

FIG. 7 is a table showing results of performance testing of pneumatic tires according to embodiments of the present technology.

Evaluations of (1) uneven wear resistance performance and (2) steering stability performance of a plurality of mutually different pneumatic tires were conducted for the performance tests (see FIG. 7). In these performance tests, pneumatic tires having a tire size of 215/60R16 were assembled on a regular rim stipulated by JATMA, inflated to the maximum air pressure and the maximum load stipulated by JATMA was applied to the pneumatic tires. A sedan with a displacement of 2.0 L was used as the test vehicle.

(1) The test vehicle was driven on a test course of 50,000 km in the performance test related to uneven wear resistance performance. After being driven, the amount of wear in each of the circumferential main grooves was measured and a difference between the maximum and minimum values was calculated. Index scoring against the Conventional Example being set as the standard score (100) was conducted based on the measurement results. In these evaluations, higher scores were preferable. A score of 105 or higher is considered as superior.

(2) The test vehicle was driven at a speed of 60 km/h on a predetermined handling course that is a dry road for the evaluation of the steering stability performance, and a sensory evaluation was conducted by a test driver. In this evaluation, the index value of the pneumatic tire of the Conventional Example was set as the standard score (100), and higher scores were preferable. A score of 105 or higher is considered as superior.

The pneumatic tire 1 of working examples 1 to 6 had the tread pattern illustrated in FIG. 2. The groove width of the circumferential main grooves 21 to 23 was 8.0 mm, and the groove width of the lug grooves 311, 341 was 4.0 mm.

Moreover, the total number of the sipes 321, 322 in the center land portion 32 in the outer side region was 140 sipes, and the total number of the sipes 331, 332 in the center land portion 33 in the inner side region was 210 sipes. The pneumatic tire 1 was mounted on the test vehicle such that the inner side region is on the inner side in the vehicle width direction.

The pneumatic tire 1 of working example 7 had the tread pattern illustrated in FIG. 5. The groove width of the circumferential main grooves 21 to 24 was 8.0 mm, and the groove width of the lug grooves 311, 351 was 4.0 mm. The groove width of the narrow groove 25 was 2.0 mm. The angle of inclination θ1 of the first narrow groove portion 251 and the angle of inclination θ2 of the second narrow groove portion 252 in the narrow groove 25 were θ1=25° and θ2=40°. Moreover, the total number of the sipes 321, 322 in the second land portion 32 in the outer side region was 140 sipes, and the total number of the sipes 343, 342 in the second land portion 34 in the inner side region was 210 sipes.

The pneumatic tire of the conventional example is based on the tread pattern illustrated in FIG. 2 and has a different sipe configuration than the pneumatic tire of the first working example.

As shown in the test results, the pneumatic tires 1 of the working examples 1 to 7 demonstrate improved tire uneven wear resistance performance and steering stability performance.

What is claimed is:

1. A pneumatic tire, comprising: a plurality of circumferential main grooves extending in a tire circumferential direction; and a plurality of land portions partitioned by the circumferential main grooves in a tread portion,
   a first region in the tread portion bordered by a tire equatorial plane being an inner side region, and a second region being an outer side region,
   the land portions respectively having a plurality of sipes extending in a tire width direction, and center land portions in the inner side region and the outer side region being provided with both three-dimensional sipes and two-dimensional sipes, the three-dimensional sipes having a three-dimensional structure portion in a center portion and having a two-dimensional structure portion at both end portions, and the two-dimensional sipes being made up solely of a two-dimensional structure portion,
   a snow traction index STI in the tire circumferential direction throughout an entire tread portion being in a range of 100≤STI,
   a sipe component STI_s_out of the snow traction index STI in the outer side region and a sipe component STI_s_in of the snow traction index STI in the inner side region having a relationship of 2.0≤STI_s_in/ STI_s_out,
   a peripheral length ratio PLR_out of a three-dimensional structure portion of sipes in the outer side region and a peripheral length ratio PLR_in of the three-dimensional structure portion of sipes in the inner side region having a relationship of 1.1≤PLR_in / PLR_out, and
   the peripheral length ratio PLR_out of the three-dimensional structure portion of sipes in the outer side region is in a range of 0.4≤PLR_out ≤0.7, and the peripheral length ratio PLR_in of the three-dimensional structure portion of sipes in the inner side region is in a range of 0.6≤PLR_in≤0.8.

2. The pneumatic tire according to claim 1, comprising three or more of the circumferential main grooves, the circumferential main grooves and the land portions being provided so as to have left-right symmetry with respect to a tire equatorial plane, wherein
    a peripheral length ratio PLR_out_sh of the three-dimensional structure portion in a shoulder land portion in the outer side region and a peripheral length ratio PLR_in_sh of the three-dimensional structure portion in a shoulder land portion in the inner side region have the relationship of 1.1≤PLR_in_sh/PLR_out_sh, and
    a peripheral length ratio PLR_out_ce of the three-dimensional structure portion in a center land portion in the outer side region and a peripheral length ratio PLR_in_ce of the three-dimensional structure portion in a center land portion in the inner side region have a relationship of 1.1≤PLR_in_ce/PLR_out_ce.

3. The pneumatic tire according to claim 1, wherein all of the land portions respectively have the plurality of sipes, and a disposal pitch of the sipes in land portions in the inner side region is narrower than a disposal pitch of the sipes in land portions in the outer side region.

4. The pneumatic tire according to claim 1, wherein a disposal ratio of the sipes having the three-dimensional structure portion in land portions in the inner side region is higher than a disposal ratio of the sipes having the three-dimensional structure portion in land portions in the outer side region.

5. The pneumatic tire according to claim 1, wherein a land portion on a tire equatorial plane has one narrow groove, and
    the narrow groove has a zigzag shape that is formed by a first narrow groove portion and a second narrow groove portion continuing in an alternating manner, and the narrow groove extends in the tire circumferential direction to divide the land portion into two portions,
    the first narrow groove portion and the second narrow groove portion are inclined in mutually different directions with respect to the tire circumferential direction, and
    an angle of inclination θ1 with respect to the tire circumferential direction of the first narrow groove portion and an angle of inclination θ2 with respect to the tire circumferential direction of the second narrow groove portion satisfy conditions of 0°≤θ1≤30°, and 10°≤θ2≤45°, and θ1≤θ2.

6. The pneumatic tire according to claim 5, wherein the narrow groove has a groove width of not less than 1.5 mm and not more than 4.0 mm.

7. The pneumatic tire according to claim 5, wherein the land portion on the tire equatorial plane has the two-dimensional sipes or the three-dimensional sipes on the inner side region side of the narrow groove.

8. The pneumatic tire according to claim 7, wherein the sipes on the inner side region side of the narrow groove are inclined to a same side as the second narrow groove portion of the narrow groove with respect to the tire circumferential direction in the land portion on the tire equatorial plane.

9. The pneumatic tire according to claim 7, wherein the land portion on the tire equatorial plane has the two-dimensional sipes on the outer side region side of the narrow groove, and
    a disposal pitch of the sipes on the inner side region side is narrower than a disposal pitch of the sipes on the outer side region side in the land portion on the tire equatorial plane.

10. The pneumatic tire according to claim 9, wherein the sipes on the outer side region side of the narrow groove are inclined to a same side as the second narrow groove portion of the narrow groove with respect to the tire circumferential direction in the land portion on the tire equatorial plane.

11. The pneumatic tire according to claim 1, wherein a pair of land portions in the outer side region, including the center land portion in the outer land region, each have a plurality of the two-dimensional sipes and/or the three-dimensional sipes having an arc shape and opposing sipes across the pair of land portions follow a same arc.

12. The pneumatic tire according to claim 11, wherein the pair of land portions in the inner side region, including the center land portion in the inner land region, each have a plurality of the two-dimensional sipes and/or the three-dimensional sipes having an arc shape and opposing sipes across the pair of the land portions follow a same arc, and
    the two-dimensional sipes and/or the three-dimensional sipes in the outer side region and the two-dimensional sipes and/or the three-dimensional sipes in the inner side region are disposed so as to protrude in mutually different directions with respect to the tire circumferential direction.

13. The pneumatic tire according to claim 1, wherein a land portion on the tire equatorial plane has a chamfered portion on an edge portion on the outer side region side, and
    a chamfer width of the chamfered portion changes cyclically in the tire circumferential direction.

14. The pneumatic tire according to claim 1, wherein a groove area ratio SG in a tire ground contact patch is in a range of 0.25≤SG≤0.40.

15. The pneumatic tire according to claim 1, having an indicator designating a mounting direction on a vehicle wherein the inner side region is on an inner side in a vehicle width direction.

16. The pneumatic tire according to claim 1, wherein all of the land portions are respectively provided with sipes having a three-dimensional structure portion.

17. The pneumatic tire according to claim 1, wherein the sipes are linear or curvilinear at a tread surface.

18. The pneumatic tire according to claim 1, wherein STI_s_in/STI_s_out≤3.0.

19. The pneumatic tire according to claim 1, wherein the center land portion does not have a sipe extending in the tire circumferential direction.

20. The pneumatic tire according to claim 1, wherein shoulder land portions do not have the two-dimensional sipes.

21. The pneumatic tire according to claim 1, wherein a shape of the three dimensional sipes, including at the center portions, at a tread surface is a straight line or a curved line without a zigzag shape.

22. The pneumatic tire according to claim 1, wherein the two-dimensional structure portion of the three-dimensional sipes in a shoulder land portion includes an outer two-dimensional structure portion outward in a tire width direction of the three-dimensional structure portion of the three-dimensional sipes in the shoulder land portion, the outer two-dimensional structure portion having a length in the tire width direction greater than a length in the tire width direction of the three-dimensional structure portion of the three-dimensional sipes in the shoulder land portion.

* * * * *